United States Patent [19]
Inakoshi

[11] Patent Number: 5,933,604
[45] Date of Patent: Aug. 3, 1999

[54] NETWORK RESOURCE MONITORING SYSTEM AND METHOD FOR PROVIDING NOTICE OF CHANGES IN RESOURCES IN A NETWORK

[75] Inventor: Hiroya Inakoshi, Kawasaki, Japan

[73] Assignee: Fujitsu Limited, Kawasaki, Japan

[21] Appl. No.: 08/744,310

[22] Filed: Nov. 5, 1996

[30] Foreign Application Priority Data

Dec. 26, 1995 [JP] Japan .................................. 7-339687

[51] Int. Cl.$^6$ .................................................. H04L 12/28
[52] U.S. Cl. .............................. 395/200.56; 395/200.75
[58] Field of Search ........................ 395/200.32, 200.49, 395/200.54, 200.55, 200.75, 739, 200.56, 200.53; 707/104

[56] References Cited

U.S. PATENT DOCUMENTS 5,678,041  10/1997  Baker et al. .......................... 395/609
5,706,210   1/1998  Kumano et al. ....................... 364/514

Primary Examiner—Ellis B. Ramirez
Assistant Examiner—William Titcomb
Attorney, Agent, or Firm—Staas & Halsey

[57] ABSTRACT

Users send requests to monitor an information resource on a communication network to a management system; the management system informs a monitoring system of the identification information for the monitoring destination resource. The monitoring system monitors the state of the monitoring destination resource on behalf of each user. When it is updated, the update information is sent to the management system. Then, the management system notifies the users of the update information, using a notifying interface corresponding to each user. Since the monitoring system monitors the resource in place of the users, access to the network by the users is reduced, reducing the load on the network.

20 Claims, 20 Drawing Sheets

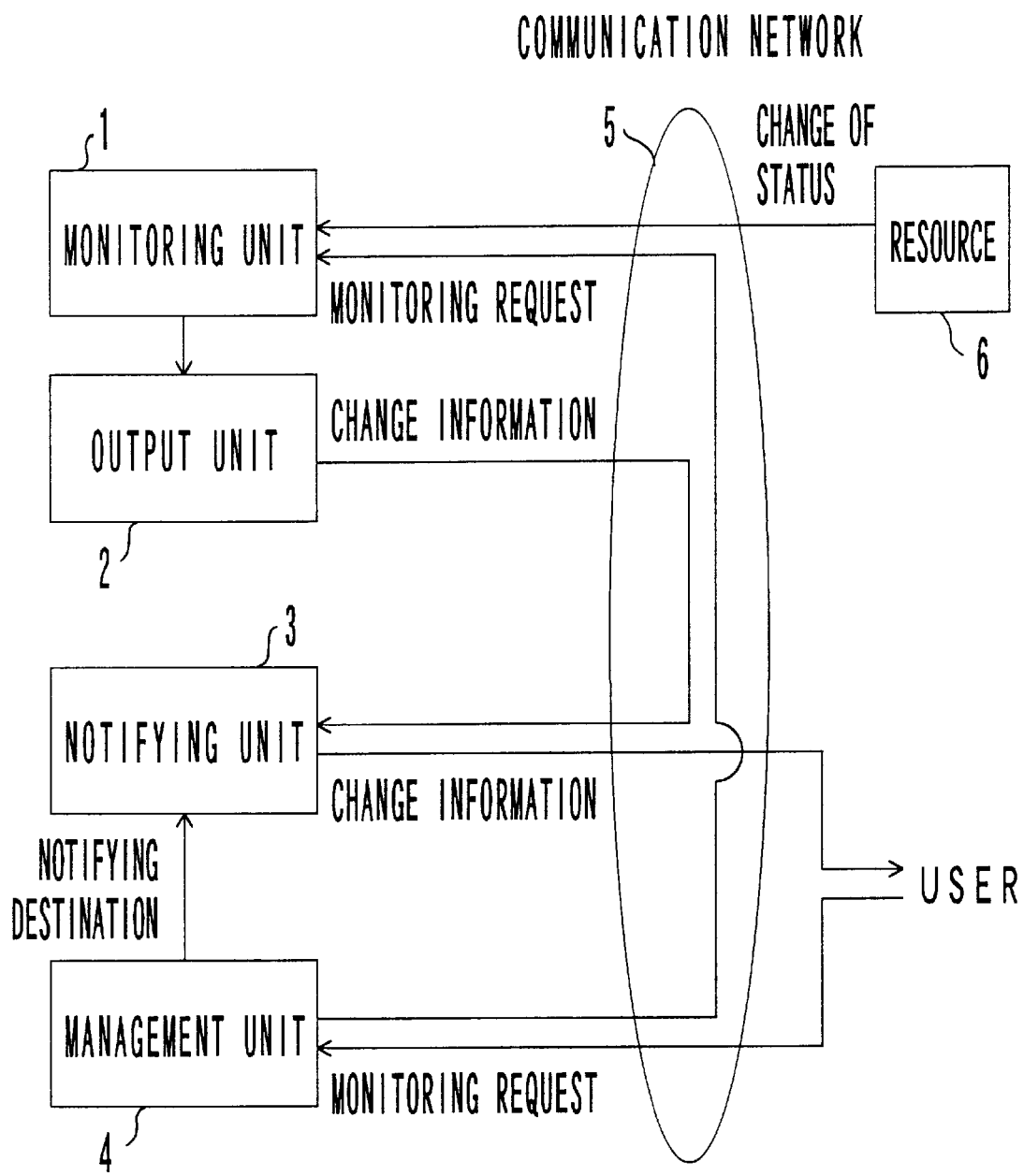
F I G. 1

```
                    PLACE
    TELENAME   :
 SUB PROCESS   :
        DATA   :
   PROCEDURE   :
        LIVE   :
```

FIG. 4

NETWORK RESOURCE MONITORING SYSTEM AND METHOD FOR PROVIDING NOTICE OF CHANGES IN RESOURCES IN A NETWORK

DETAILED EXPLANATION OF THE INVENTION

Technological Field to Which the Invention Belongs

This invention relates to a communications network to which a plurality of information resources are connected. Specifically, it relates to a network resource monitoring system and method for monitoring changes in information resources on the network.

Description of the Prior Art

In recent years, the number of users of the Internet, which is a communications network that makes it possible to send information at low cost, has been increasing on a world-wide scale. This "Internet fever" has produced a massive flood of information sent out onto the communications network by users. Such an excess supply of information is called a "cyberglut". Users who wish to receive information from this cyberglut are faced with the extremely difficult task of finding the information that they want on the network.

Meanwhile, senders of information want to find users who are interested in the information that they have to offer and transmit that information to them. For this purpose, they use other media such as magazines and advertisements, and electronic publishing systems, to send information to subscribers.

The said Internet users are faced with the following problems which are more severe than what they have faced in the past.

On the network in its present condition, no means is provided for users to efficiently search for the information that they want; in many cases senders simply keep sending information out onto the network in a haphazard manner. In addition, if the sender of information changes the information, the user will not know about the change unless the user accesses the network again. For this reason, there is a tendency for information to simply be sent out onto the network in one direction, wasting the capability of multimedia "bidirectionality".

In addition, it is necessary for the receiver to access the information resource periodically to check whether there has been any change or not, which raises the problem of increased communication cost. This problem is particularly serious when the resource which is far away in terms of network distance, is used. This results in wasted use of the capacity of the network, in some cases causing the network throughput to drop and even make it practically impossible for sites with weak connections to communicate.

If there were a method that would make it possible for the user to know of changes in an existing information resource, the trouble of accessing repeatedly for checking could be eliminated. This would have the advantage of freeing a great deal of time to uncover new information. However, in the existing state of the technology, this kind of change notification service.

SUMMARY OF THE INVENTION

This invention is for the purpose of providing a network resource monitoring system and method which, by monitoring changes in information on a communications network, can reduce the number of times that users access the network and reduce the load on the network.

The network resource monitoring system of this invention has a monitoring unit, an output unit, a notifying unit and a management unit, and monitors an information resource on a communication network.

One aspect of this invention is that the monitoring unit monitors the state of a resource on a communication network based on requests from users, while the output unit outputs change information that indicates that there has been a change in the state of the resource.

A resource is, for example, image information and text information that a sender creates and sends out, such as a home page on the Internet, and can be updated by the sender. Which resource on the communication network is to be the target of monitoring is specified by the user at the time of the monitoring request. A monitoring request from a user is, for example, sent from the management unit to the monitoring unit.

The monitoring unit for example accesses the resource periodically and checks its state; when it is seen that it has been updated, the fact that there has been a change in the state of the resource is sent to the output unit. Upon receiving this, the output unit outputs change information that includes resource identification information, etc. to the communication network.

This change information is, for example, sent to a notifying unit via the communication network, and finally is notified to the user. In this way, the user learns that the information of the specified resource has been updated.

In this system configuration, since the resource is monitored by the monitoring unit instead of the user, it becomes unnecessary for the user himself to access the resource. Consequently, the number of times that the user accesses the resource can be held to a minimum. The monitoring unit can monitor a resource on behalf of not only one user but a plurality of users.

In addition, if the monitoring unit and the output unit are located close to the resource in terms of distance on the network, the communication cost that accompanies the monitoring is kept low, so that the load on the network can be reduced.

Further, the management unit receives monitoring requests that request monitoring of the state of a resource on the communication network from users, and manages the notification destinations when there has been a change in the state of the resource.

Then the notifying unit notifies the notification destinations of change information that indicates that there has been a change in the state of the resource.

A monitoring request from a user includes for example identification information that specifies which resource is to be the target of monitoring and the notification destinations for the change information, and sends this to the management unit via the communication network. Means such as electronic mail are used to send monitoring requests, and for example the user's electronic mail address can be specified as the notification destination.

Another aspect of this invention is that the management unit stores resource identification information and notification destinations, matched to one another, in a storage device such as a database. Then, when change information is received from the communication network, the notifying unit asks the management unit for the notification destinations that are matched to the resource in which the change occurred, and sends the change information to those notification destinations.

If a notification destination is a user's electronic mail address, mail including the identification information of the resource is sent to the user's terminal. In this way the user learns that there has been a change in the information on the specified resource.

In this system configuration, the management unit manages the notification destinations for change information, so the fact that there has been a change in a resource is automatically reported to the user. For this reason, it becomes unnecessary for the user himself to access the resource, making it possible to reduce the number of times that the user accesses the resource to a minimum. In addition, if a plurality of users have requested that the resource be monitored, the change information is notified to all of those users.

In the system configuration described above, if the monitoring unit and the output unit are located close to the resource in terms of distance on the communication network, and the notifying unit and the management unit are located close to the user terminal, both the communication cost that accompanies monitoring and the communication cost to the user can be reduced to a low level. Consequently, the load on the network is reduced.

Still another aspect of this invention is that the information processing terminal of a user connected to a communication network has an input interface unit and a notifying interface unit. The input interface unit inputs monitoring requests that request monitoring of the state of a resource on the communication network to the information processing terminal, while the notifying interface unit receives the change information that indicates that there has been a change in the state of the resource.

The information processing terminal sends monitoring requests that are input to the monitoring unit, for example, via the management unit. Then, when the output unit outputs change information, it is sent to the notifying interface unit in the information processing terminal via the notifying unit. In this way, the user learns that there has been a change in the state of the specified resource.

BRIEF DESCRIPTION OF THE DRAWINGS

FIG. 1 shows a diagram of the principle of a network resource monitoring system according to this invention;

FIG. 4 shows the composition of a place;

DESCRIPTION OF THE PREFERRED EMBODIMENT

Figure 2:
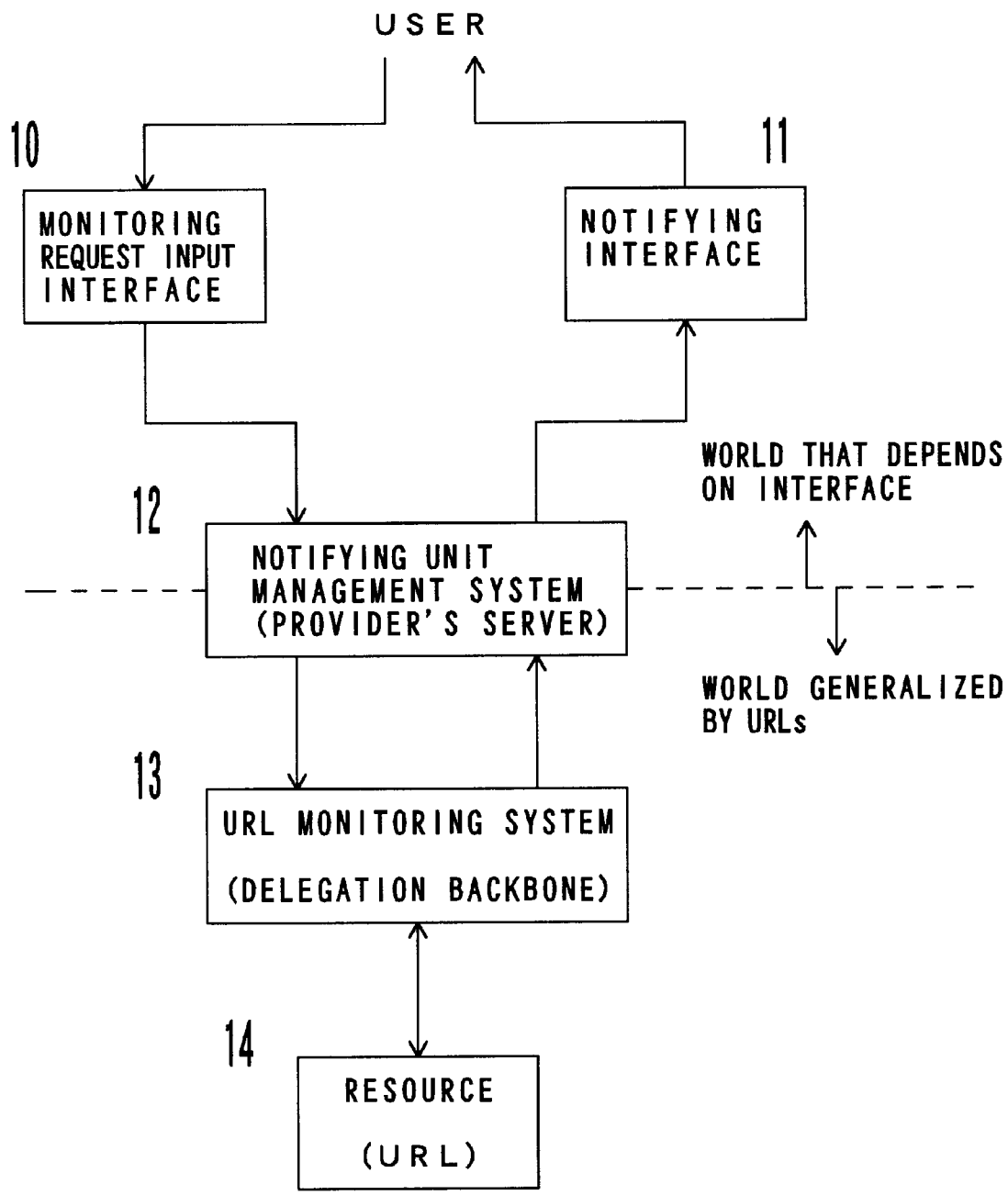
FIG. 2 shows a configuration diagram of the network resource monitoring system.

An embodiment of this invention will now be described in detail, referring to the drawings.

FIG. 1 is a diagram showing the principle of a network resource monitoring system according to this invention. The network resource monitoring system shown in FIG. 1 has a monitoring unit 1, an output unit 2, a notifying unit 3 and a management unit 4, and monitors the information resource 6 on the communication network 5.

The monitoring unit 1 monitors the state of the resource 6 on the communication network 5 based on a request from a user.

The output unit 2 outputs change information that indicates a change in the state of the resource 6.

The resource 6 is, for example, image information and/or text information, such as a home page on the Internet, that is created and transmitted by a user. Which resource on the communication network 5 is the target of monitoring is specified at the time of the user request. The monitoring request from the user is sent, for example, from the management unit 4 to the monitoring unit 1.

The monitoring unit 1 for example accesses the resource 6 and checks on its state periodically. When it is determined that the resource has been updated, the monitoring unit 1 transmits the fact that the state of the resource 6 has changed to the output unit 2. Upon receiving this notice, the output unit 2 outputs change information, including information that identifies the resource 6, to the communication network 5.

This change information is sent to, for example, the notifying unit 3 via the communication network 5, and finally is notified to the user. In this way, the user learns that the information of the specified resource 6 has been updated.

In this system configuration, the monitoring unit 1 monitors the resource 6 in place of the user, so it becomes unnecessary for the user himself to access the resource 6. Consequently, it becomes possible to reduce the number of times that the user accesses the resource 6 to a minimum. The monitoring unit 1 can monitor the resource 6 for not only a single user but for a plurality of users.

If the monitoring unit 1 and the output unit 6 are placed in a location on the communication network 5 that is close to the resource 6, the communication cost that accompanies monitoring can be reduced, making it possible to reduce the load on the network.

The management unit 4 receives the monitoring request that requests monitoring of the state of the resource 6 on the communication network 5 from the user, and manages the destination of the change notice that is notified when there has been a change in the state of the resource 6.

The notifying unit 3 notifies the notification of destination information that indicates that there has been a change in the state of the resource 6.

The monitoring request from the user includes, for example, identification information that specifies the resource 6 that is the target of monitoring and the notification destination for change information, and is sent to the management unit 4 via the communication network 5. A means such as electronic mail is used to send the monitoring request, and, for example, the user's electronic mail address is specified as the notification destination.

The management unit 4 stores the identification information for the resource 6 and the notification destination, matched to one another, in a storage device such as a database. When the notifying unit 3 receives change information from the communication network 5, inquiry is made of the management unit 4 as to what is the notification destination that corresponds to the resource 6 in which there was a change, and the change information is sent to that notification destination.

If the notification destination is the user's electronic mail address, then mail including the identification information for the resource 6 is sent to the user's terminal. In this way, the user learns that the information of the resource 6 which the user has specified has been updated.

In this system configuration, the management unit 4 manages the notification destination of the change information, so the user is automatically notified that the resource 6 has been updated. For this reason, it becomes unnecessary for the user himself to access the resource 6, making it possible to reduce the number of times that the user accesses the resource 6 to a minimum. If there are a plurality of users who have requested that the resource 6 be monitored, the change information is notified to all of those users.

In the system configuration shown in FIG. 1, if the monitoring unit 1 and the output unit 2 are located close to the resource 6 on the communication network 5, and the notifying unit 3 and the management unit 4 are located close to the user's terminal, it is possible to reduce both the communication cost that accompanies the monitoring and the cost of communicating with the user. Consequently, the load on the network is reduced.

For example, the monitoring unit 1 and the output unit 2 shown in FIG. 1 correspond to the URL monitoring system 13, which will be described below and is shown in FIG. 2, and the notifying unit 3 and the management unit 4 correspond to the notifying unit management system 12.

Today, there are a variety of ways to access the Internet. This variety of means includes, for example, WWW browsers (World Wide Web browsers), which are now highly popular Internet information search tools; a method that uses E-mail; and a method that uses a PDA (Personal Digital Assistant). A PDA is a small portable information terminal that combines a microcomputer, a display, a pen input function and a communication function.

However, the characteristics of these access methods differ greatly from one to another; since each has its own form, their information gathering capacities are not uniform. For example, A WEB browser is able to access information resources on the network by tracing the links among documents in a kind of hypertext configuration.

Let us consider how one could provide a service that gives notice of change in resources to users who are using such a variety of access methods. In this case, the way of submitting a request to monitor a resource to a service provider, and the way that the provider gives notice of change in a resource, will differ depending on the user's access method. Consequently, the needs of these users with respect to this service are varied.

Access methods are varied as discussed above, but fortunately there is what is called the URL (Uniform Resource Locator) for expressing information that identifies resources on the network in a unified manner. In the embodiment described below, the location of a resource is expressed by the URL in a generalized manner, and the method of submitting a monitoring request is separated from the method of receiving update information (change information). In this way it is possible to prevent the expected confusion of protocols when it is necessary to match each of a variety of means of communication individually. In addition, it becomes easy to support another means of communication that is newly introduced.

FIG. 2 is a configuration diagram of this kind of network resource monitoring system. The network resource monitoring system shown in FIG. 2 has a monitoring request input interface 10, a notifying interface 11, a notifying unit management system 12 and a URL monitoring system 13. This system monitors a URL resource specified by the user and notifies the user of changes in it. The monitoring request input interface 10 and the notifying interface 11 could be, for example, a WEB browser terminal, an E-mail terminal or a PDA.

The monitoring request input interface 10 notifies the notifying unit management system 12 of the URL which is the target of monitoring and the means of notification input by the user, together with the monitoring request. The notifying unit management system 12 is, for example, the server of the provider who provides the connection service to the Internet, and notifies the URL monitoring system 13 of the monitoring request. Then the URL monitoring system 13 monitors the state of the specified URL resource 14 and, when it changes, immediately provides that information to the notifying unit management system 12.

The notifying unit management system 12 manages the notifying unit that notifies the notifying interface 11 of the monitoring results. The information received from the URL monitoring system 13 is notified to the notifying interface 11 by a corresponding means of notification. In this way, the user learns that there has been a change in the state of the resource 14, and can then access that resource to obtain the changed information.

In the network resource monitoring system shown in FIG. 2, the URL monitoring system 13 belongs to a world in which everything is put into generalized form by the URL and functions as the backbone of the system. The notifying unit management system 12 is located on the boundary between a world in which everything depends on the interface and a world in which everything is in generalized form, and can provide a monitoring service based on updated information from the backbone. Each service provider makes the backbone protocol public so that a monitoring service that supports a variety of means of notification for the users can be provided.

Figure 3:
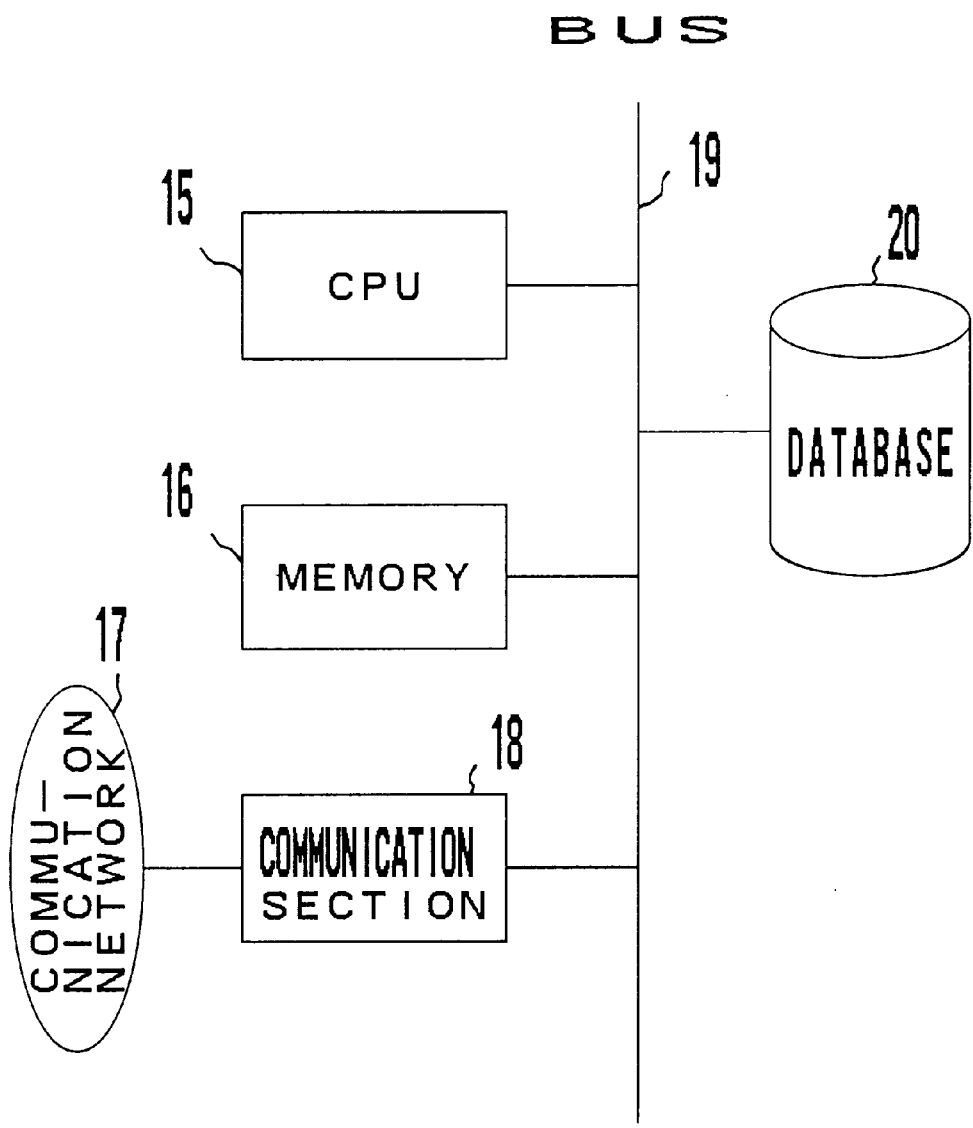
FIG. 3 shows a configuration diagram of the information processing unit.

FIG. 3 is a configuration diagram of an information processing device that is used as one example of a notifying unit management system 12 and a URL monitoring system 13. The information processing device shown in FIG. 3 has a CPU (Central Processing Unit) 15, a memory 16, a communication section 18, a database 20 and a bus 19 that links the other sections, and is connected to the communication network 17 via the communication section 18.

The CPU 15 uses the memory 16 to generate the processes necessary to provide the monitoring service; the data in the database 20 are referred to during the processing. The communication section 18 sends information to and receives information from the communication network 17.

When an attempt is made to use this kind of monitoring service to maintain an FTP (File Transfer Protocol) site managed by a user, it is convenient to not only know when a change occurs but also to be able to physically transfer and delete files.

If the provider has the necessary capability, a process such as an FTP site management demon is created inside the notifying unit management system 12 and manages the FTP site files. This makes it possible for the monitoring service to be accepted even in an open world. This FTP site file operation will be described below.

It is expected that in the monitoring of the resource 14 it will become necessary to access it periodically, which will make the communication cost very high. As was explained above, this tendency is particularly strong when monitoring a resource that is a long distance away in terms of distance on the network. Consequently, in the case of the Internet, which is world-wide in scope, it is possible that the load on the network will become very large.

For this reason, it is possible for delegation to be used effectively in the backbone that monitors the URL. Delegation is a method which is commonly used to build fire walls to limit access in order to protect the numerous networks connected to the Internet.

In many cases, a local network is connected to the Internet via a gateway, and the processing unit in the gateway restricts external access. In such a case, the processing unit in the gateway represents each of information processing units in the local network in restricting external access. Such a method is called delegation.

The embodiment described below uses this same delegation capability for the purpose of reducing the load on the network; the URL monitoring system 13 is used as the delegation backbone. The URL monitoring system 13 has the capability to monitor the resource 14 on behalf of individual users. In this way, it becomes unnecessary for each user to access the resource 14 frequently in order to check it, reducing the load on the network.

This kind of delegation system is made more practical by putting the monitored resource in generalized form with URL. If it were not put into generalized form, then it would become necessary to have numerous delegation systems for resources that are managed by different protocols; by monitoring with URL, it becomes possible to use only a single delegation system.

Although information can be transmitted within the network resource monitoring system shown in FIG. 2 by an arbitrary means of communication processing, in the present embodiment as an example we use Telescript, which is a language based on remote programming.

In remote programming using Telescript, an agent, which is a type of process that holds data, is used. In this case, it is possible to have each agent hold each user's monitoring request information, so it is possible to process requests from a plurality of users independently. In addition, since an agent functions autonomously and automatically disappears when the processing ends, it is appropriate for processing on a network that is used by a large indeterminate number of users.

Remote programming in Telescript is described in detail in "A method of implementing remote programming" (Japanese Patent Application 06-179767; Japanese Patent Application Laid-Open 07-182174; Priority US 08/090,521), and this method will now be briefly explained here.

This remote programming is one method of describing processing on a communication network that links a plurality of computer systems. This is achieved by means of agents, which are processes that can wander through the network, and places, which are fixed processes that are entered by the agents.

FIG. 4 shows the configuration of a place. A place has a telename that distinguishes it from other processes, and can have an arbitrary finite number of subprocesses. In addition, a place has an arbitrary finite number of data to which the place itself and other processes can refer, and an arbitrary finite number of procedures that the place itself and other processes can call.

In addition, a place has a LIVE procedure as its main routine; a place which has been created executes the LIVE. The place only exists while the LIVE is being executed; when the LIVE ends, the place disappears. When the place disappears, its subprocesses end and disappear.

Figure 5:
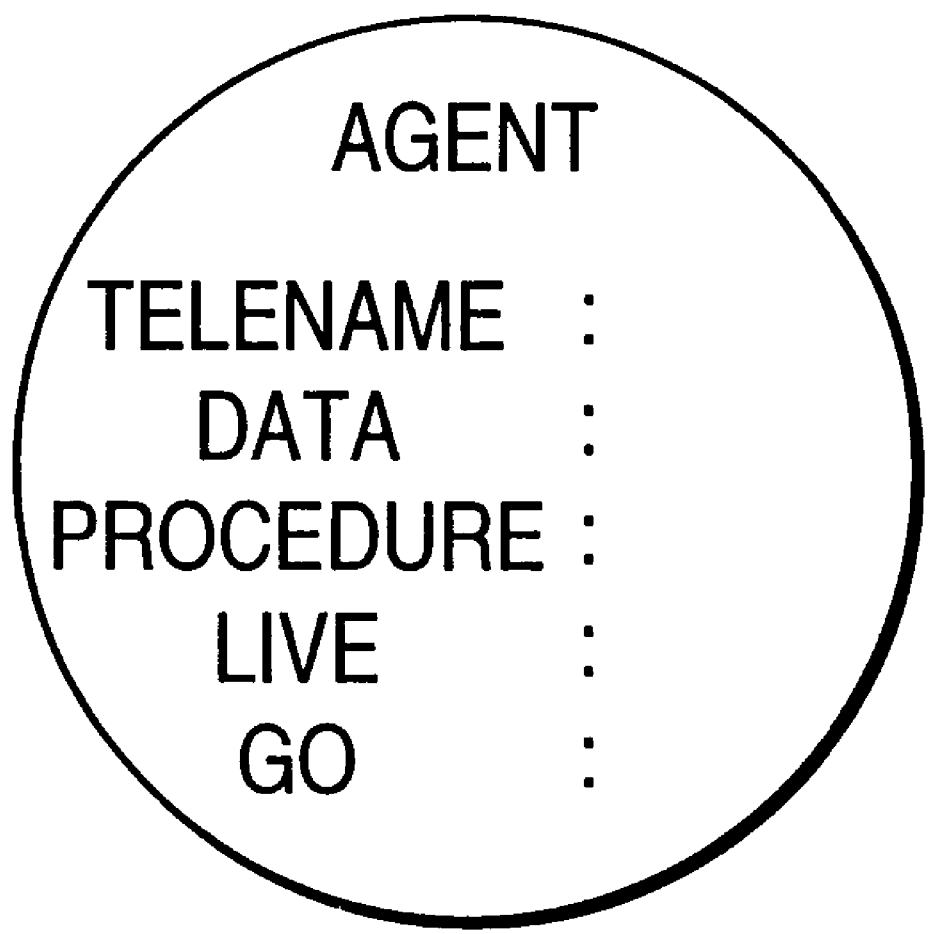
FIG. 5 shows the composition of an agent.

FIG. 5 shows the configuration of an agent. An agent has a telename that distinguishes it from other processes, and only exists as a subprocess inside a place. In addition, an agent has an arbitrary finite number of data to which the agent itself and other processes can refer, and an arbitrary finite number of procedures that the agent itself and other processes can call.

In addition, an agent has a LIVE procedure which is its main routine; an agent that is created executes the LIVE. The agent only exists while the LIVE is being executed; when the LIVE ends, the agent disappears. When the command GO is executed inside an agent's LIVE procedure, that agent moves to a specified destination via the network.

Figure 6:
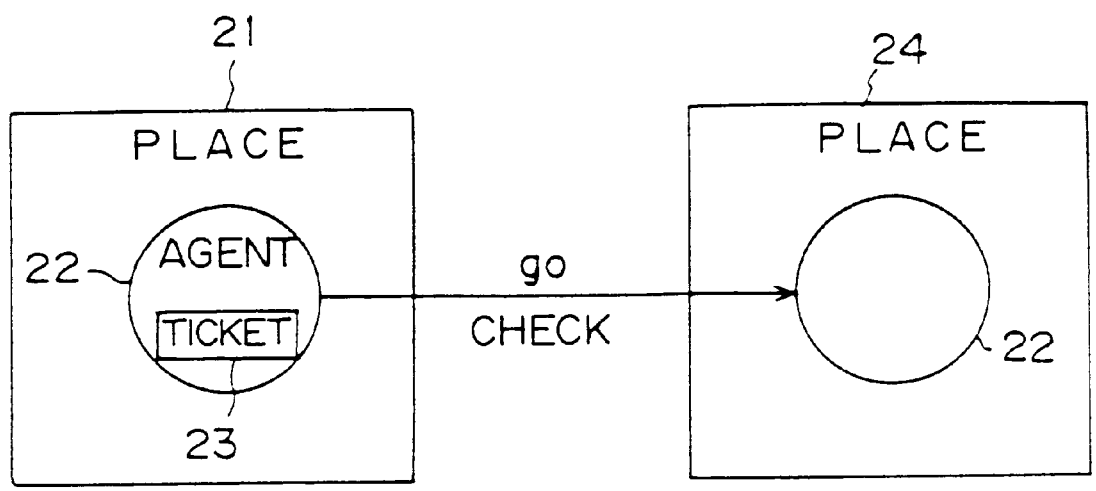
FIG. 6 is a diagram showing the operation GO.

FIG. 6 shows an example of an operation executed by the command GO. In FIG. 6, the agent 22 inside the place 21 acquires the ticket 23 which is a datum that specifies the place 24 as its destination in the execution of GO, and moves to the specified place 24.

At this time, the agent 22 is caused to temporarily suspend execution of the LIVE by the GO command, and is compressed and packed together with the data that it holds. Then it is sent to the place 24 specified by the ticket 23; the place 24 then conducts an acceptance check. When the agent is accepted by the place 24, after it is positioned inside of the place as a subprocess it is defrosted and the execution of LIVE is resumed from the command after GO.

Further, the agent can call the command MEET that requests another agent in the place within which it has been placed inside the procedure LIVE. When the command MEET is executed, the agent uses a petition, which is a datum that specifies the other agent.

Figure 7:
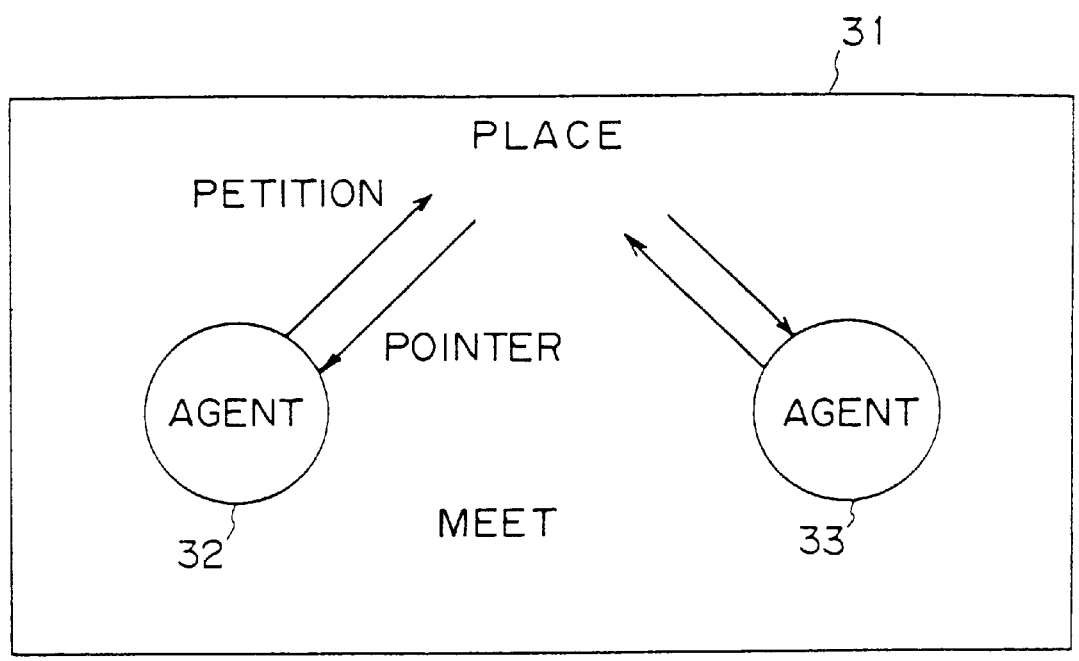
FIG. 7 is a diagram showing the operation MEET.

FIG. 7 shows an example of an operation performed by the command MEET. In FIG. 7, the agent 32 inside the place 31 specifies a petition using the command MEET. The place 31 searches for the agent that meets the conditions specified by the petition. If the requested agent is not inside the place 31, the system waits for that agent to enter.

If there is an agent 33 inside the place 31 that satisfies the conditions of the petition, the place 31 informs the agent 33 that the agent 32 desires mutual interaction. When the agent 33 returns a value that indicates the intention to accept the request of the agent 32, the place 31 returns a pointer to the agent 33, as a MEET return value, to the agent 32. Then the agent 32 can access the agent 33 directly, and it becomes possible to, for example, exchange information.

Hereafter, the act of moving by an agent in response to a GO command will be described as "to go", and mutual interaction with another agent in accordance with a MEET command will be described as "to meet".

Figure 8:
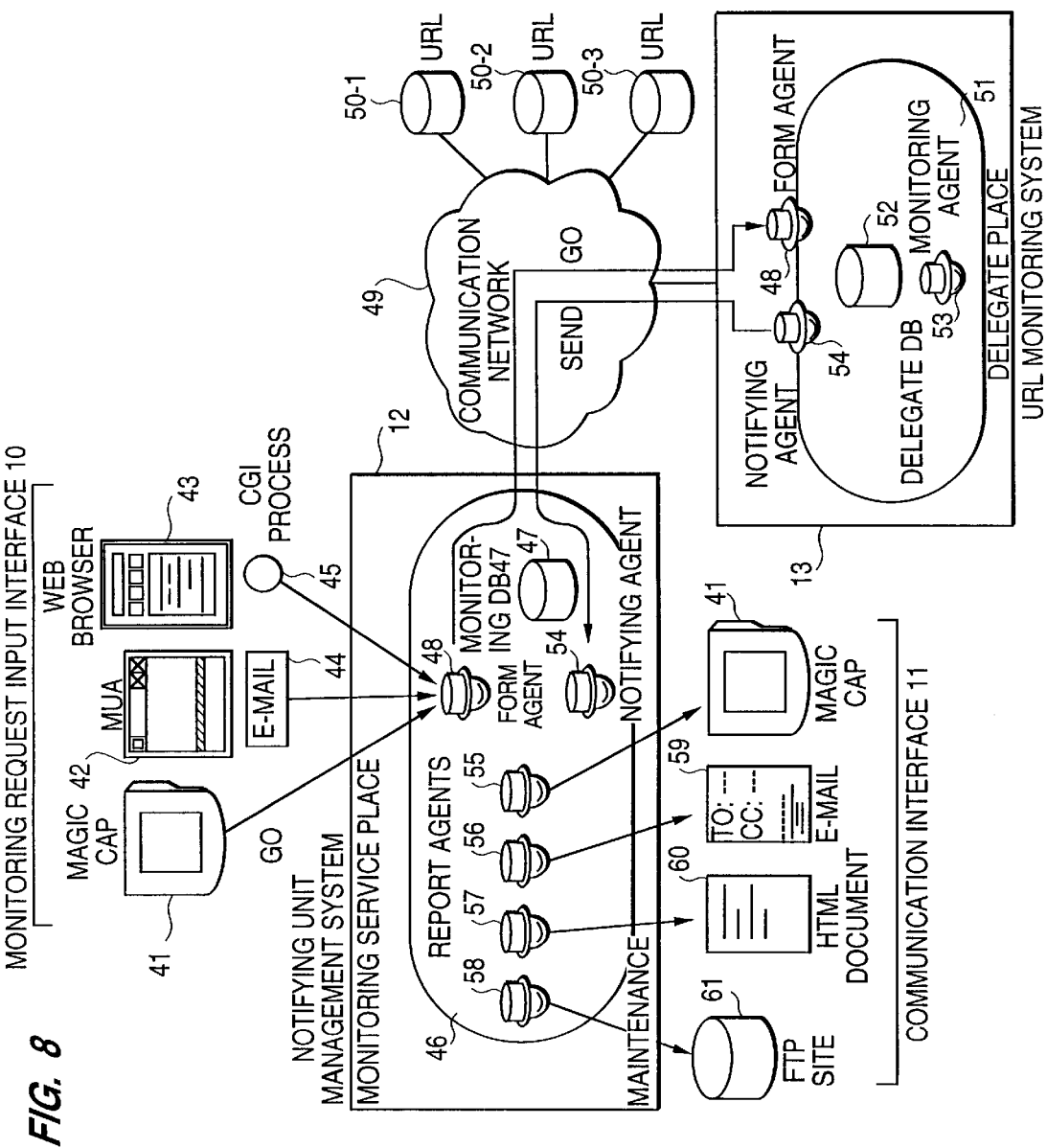
FIG. 8 is a diagram showing a network resource monitoring system that uses agents.

FIG. 8 is a configuration diagram of a network resource monitoring system that uses remote programming as described above. In FIG. 8, the monitoring service place 46 and the delegate place 51 are places that have respective determined functions; while the form agent 48, the monitoring agent 53, the notifying agents 54 and 54' and the report agents 55, 56, 57 and 58 are agents that have their respective data and functions.

The Magic Cap 41, the MUA (Mail User Agent) 42 and the WEB browser 43 correspond to the monitoring request input interface 10 in FIG. 2 and are used when a user inputs a monitoring request. The specific differences among these will be discussed below. A notifying unit management system 12 is, for example, provided for each provider; each has a monitoring database (DB) 47 and a monitoring service place 46 that provides monitoring service to the user.

The URL monitoring system 13 has a delegate database (DB) 52 and a delegate place 51 that monitors the resource in place of the user. In order to reduce the communication cost that accompanies monitoring there is such a URL monitoring system 13 for each URL group that is nearby in terms of communication distance. For a URL to be nearby in terms of communication distance means that the URL can be accessed at relatively low cost. For example, there can be one URL monitoring system 13 for each country that is connected to the Internet, or there could be one for each local server.

The notifying unit management system 12 and the URL monitoring system 13 are connected via the communication network 49 and can exchange information. In addition, the communication network 49 is also connected to the resources 50-1, 50-2 and 50-3 that are identified by the URL. The number of resources that are connected is arbitrary. Hereafter, a resource such as this will simply be referred to as "URL".

When a monitoring request is input to the monitoring request input interface 10, a form agent 48 appears within the monitoring service place 46. After the form agent 48 updates the monitoring DB 47, the form agent 48 goes to the delegate place 51 via the communication network 49 and updates the delegate DB 52. The user's URL, which is the notification destination for the monitoring result, is stored in the monitoring DB 47, and the address information of the monitoring service place 46, which is the notification destination, is stored in the delegate DB 52.

The monitoring agent 53 refers to the delegate DB 52 and monitors the monitoring destination URL; when it is updated a notifying agent 54 is created. The notifying agent 54 executes a SEND command and sends the notifying agent 54' to the monitoring service place 46.

SEND is a command that is executed within the agent's LIVE procedure, creates a duplicate of that agent and sends it to another place. Here, the notifying agent 54' is created as a clone agent of the notifying agent 54.

The notifying agent 54' creates the report agents 55, 56, 57 and 58 matching the notification destination URL of the monitoring DB 47. The report agents 55, 56, 57 and 58 report the results to the users by means of notification that match the respective notifying interfaces 11. The processing by those report agents will be described in detail below.

In the above configuration, information on the updated monitoring destination URLs is automatically notified to the user, so it is not necessary for the user himself to check the resource. In addition, the notifying unit management system 12 and the URL monitoring system 13 are separate from one another, so a URL monitoring system 13 that is close to the monitoring destination can represent a plurality of users in monitoring the URL.

Consequently, frequent accesses by a large number of users for the purpose of monitoring a resource are eliminated, greatly reducing the load on the network.

Next, let us explain the specific processing in the network resource monitoring system shown in FIG. 8, referring to FIGS. 9 through 14.

Various types of devices and programs can issue monitoring requests to the network resource monitoring system. For example, the WEB browser 43 in FIG. 8 is a software tool that searches for information dispersed on the Internet with a hypertext base; the MUA 42 is a software tool that issues E-mail. The Magic Cap 41 is a type of PDA terminal that uses agents. The WEB browser 43 and the MUA 42 are inside the user's terminal computer.

Of course, the way in which a monitoring request is issued differs for each type of device and program, but the following 2 conditions must be satisfied.

(1) It must be possible to create form agents 48 on the monitoring service place 46 by some means or other.

(2) The following data must be given to the form agent 48.
 The monitoring destination URL
 The notification destination URL
 The requesting user's ID and password
 Comments
 Reference data The monitoring destination URL is the URL of the resource that is the target of monitoring. The notification destination URL is the URL that notifies the result of the monitoring. The requesting user's ID and password are information that identify the requesting user. Normally, a notification destination URL is assigned for each requesting user's ID. Comments and reference data are not absolutely necessary but can be added as needed.

Thus, by creating form agents 48 that are independent of the monitoring input interface form, it becomes possible to accept monitoring requests from various types of programs, increasing the expendability of the system.

Next, let us explain an example of monitoring request input. An input device could be a pointing device such as a mouse, or a keyboard. If the WEB browser 43 is used, the user first opens an HTML (HyperText Markup Language) document in a monitoring request form, then the blanks in that form are filled in. HTML is a language used to describe hypertext documents having links to other documents; a document described in this language is called an HTML document.

Figure 9:
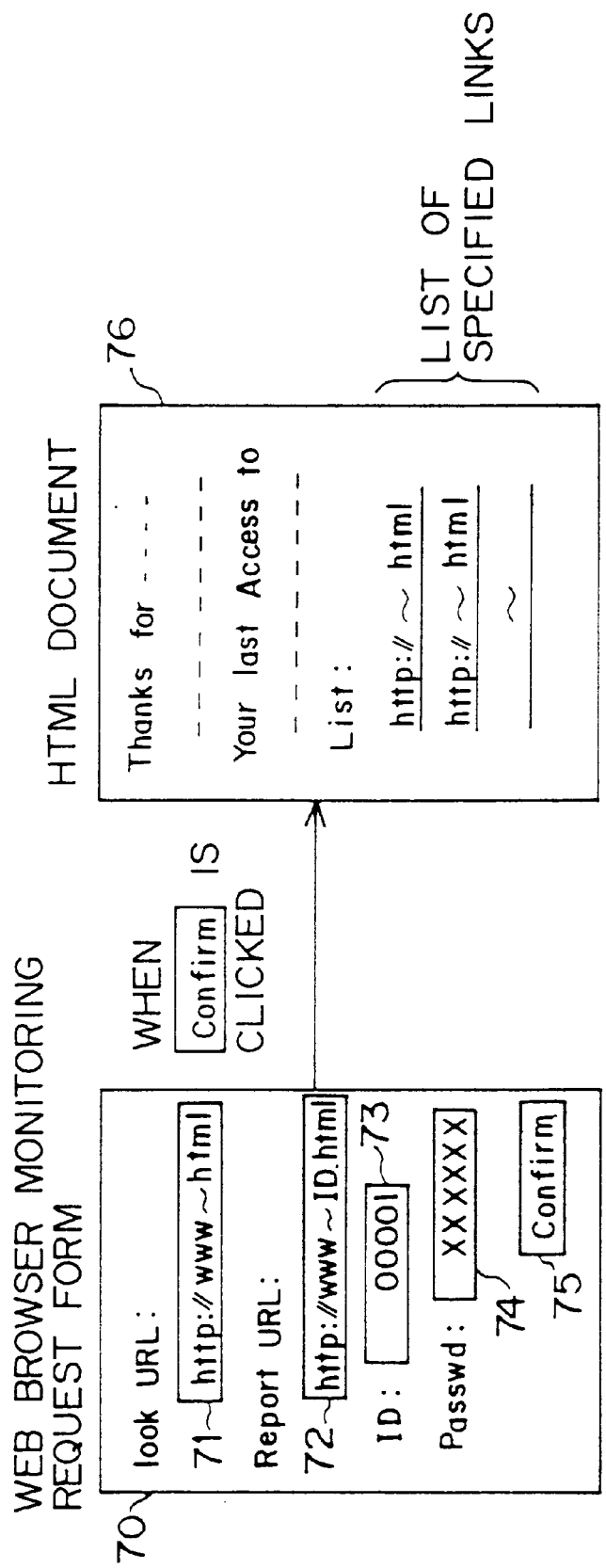
FIG. 9 shows an example of monitoring request form input.

FIG. 9 shows an example of input of a monitoring request form displayed on a user terminal display. In the monitoring request form 70 in FIG. 9, Look URL 71 is the monitoring destination URL, Report URL 72 is the notification destination URL and ID 73 and Passwd 74 are the requesting user's ID and password, respectively. After this information is input, when the Confirm button 75 is clicked the CGI (Common Gateway Interface) process 45 in FIG. 8 is started up.

The CGI process 45 opens the HTML document 76 determined for each ID 73. The HTML document 76 is used for the purpose of displaying a list of links to specified resources that are targets of monitoring (URLs). Here, specified monitoring destination URLs are written into the HTML document 76 as links, and the list of links is displayed on a display unit.

Next, the CGI process 45 establishes a connection to a cloud. A cloud is a software environment for the purpose of interpreting and executing a programming language on a network; here it corresponds to the monitoring service place 46. The CGI process 45 performs interprocess communication through the connections that have been established, and sends the parameters input on the monitoring request form 70 to the monitoring service place 46.

The monitoring service place 46 creates a form agent 48 based on the parameters that were sent to it.

If an MUA 42 is used as the monitoring request input interface 10, the user sends the E-mail (control mail) 44 in a prescribed format to the monitoring service place 46.

Figure 10:
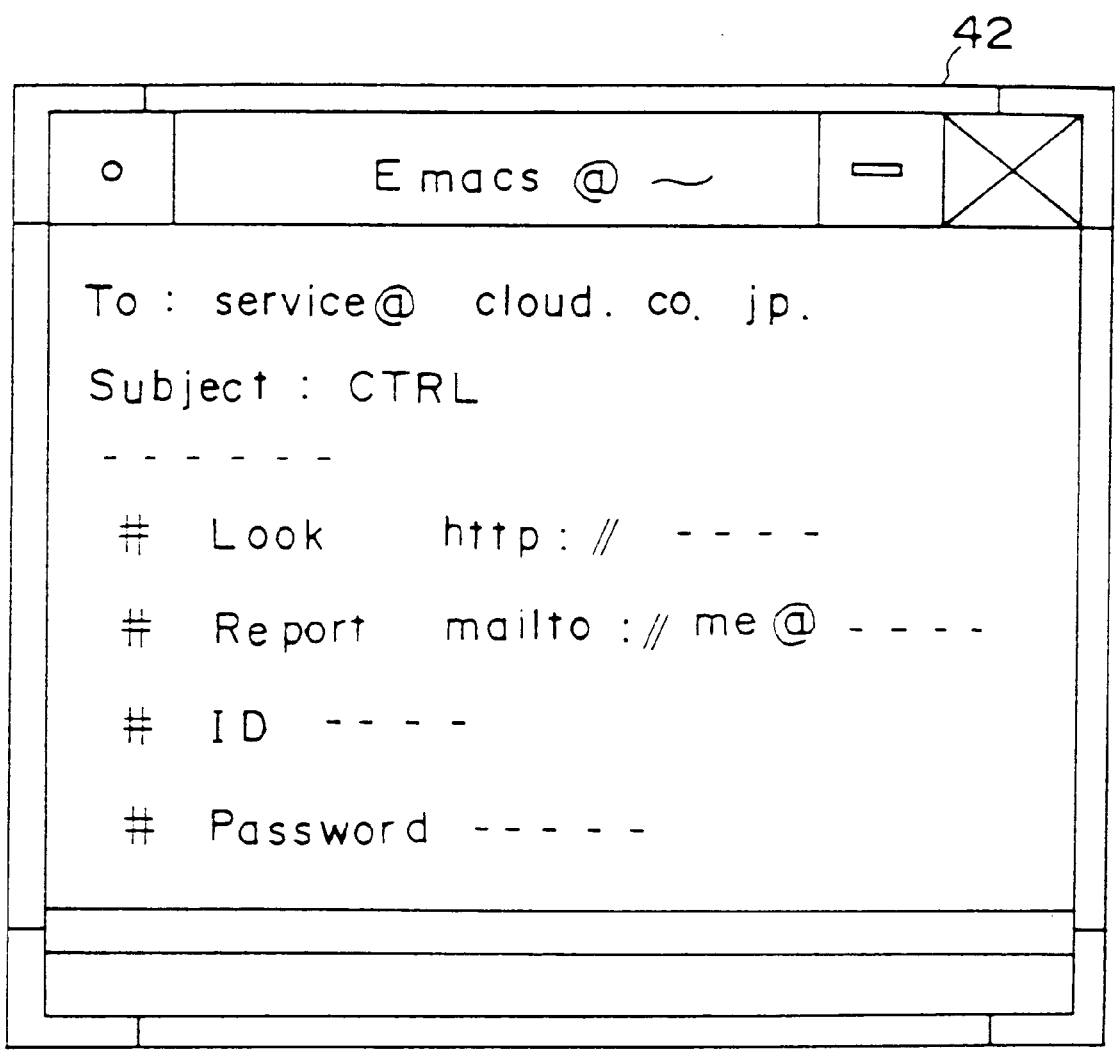
FIG. 10 shows an example of control mail.

FIG. 10 shows an example of control mail 44 created by the MUA 42. As in the case of the monitoring request form 70, the control mail 44 contains information such as a Look URL (monitoring destination URL), Report URL (notification destination URL), ID and password.

The monitoring service place 46 can listen to the communication at a send mail port inside the notifying unit management system 12 and recognize the sendmail protocol. Then it receives the control mail 44, parses it and analyzes the constituent elements of the mail. Next, a form agent 48 is created based on the result of that analysis.

If a Magic Cap 41 is used as the monitoring request input interface 10, the user creates Magicmail in an exclusive format and sends it to the monitoring service place 46. Magicmail is a form of mail used to send messages by move of an agent that has the contents of the mail as data, from one computer to another.

Here, the Magicmail send processing creates a form agent 48 that has data such as a monitoring destination URL, a notification destination URL, the requesting user's ID and password, etc., on the Magic Cap 41. Then it goes directly to the monitoring service place 46.

Next, let us explain the processing by the form agent 48 created in this way. The form agent 48 has the role of registering the notification destination URL in the monitoring DB 47, registering the address of the notification destination place in the delegate DB 52, and informing the notifying agents 54 and 54' of the path at the time the results are notified. For this reason, the form agent 48 has the capability to add records to the monitoring DB 47 and the delegate DB 52, and to change those records.

Figure 11:
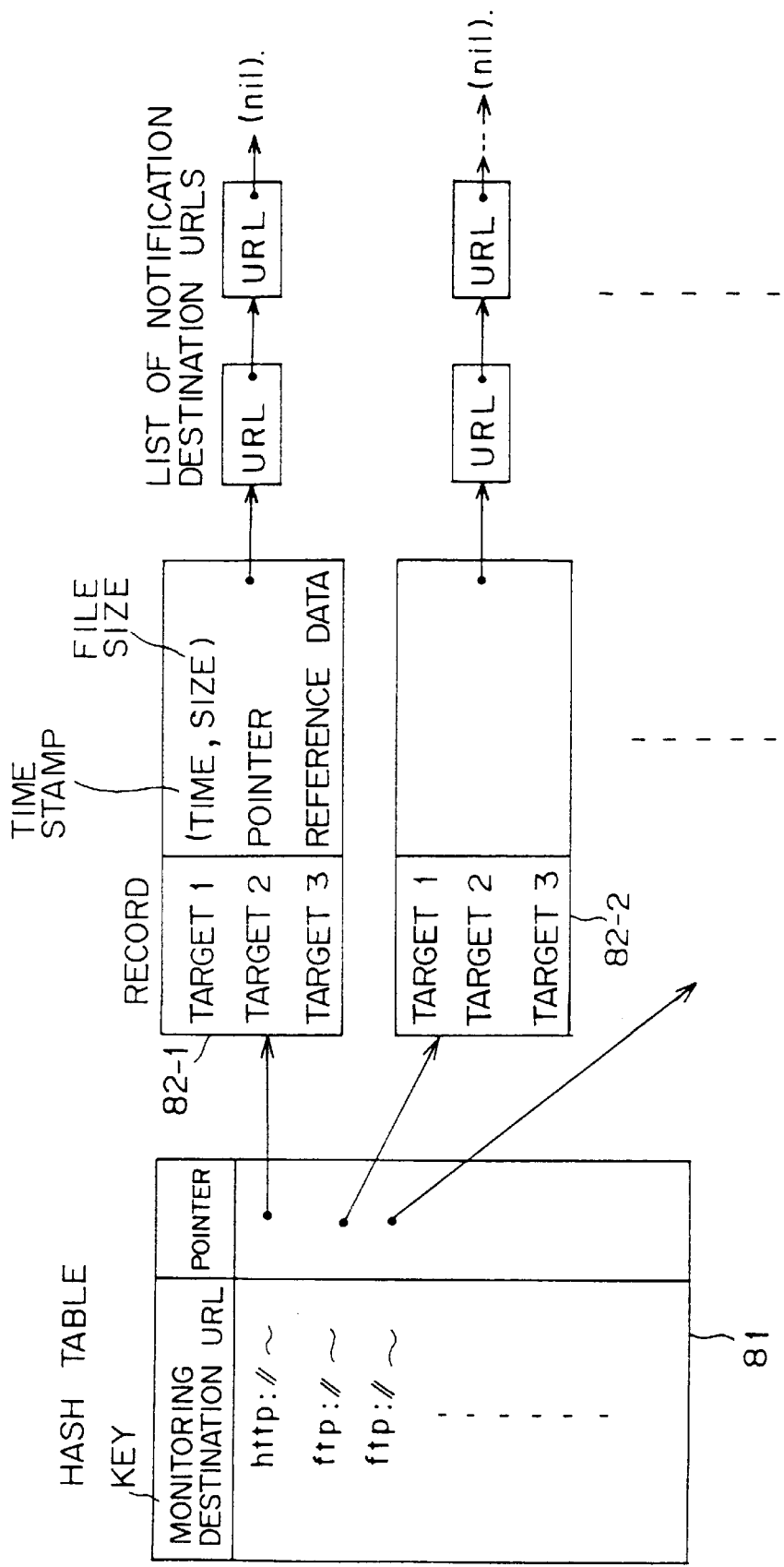
FIG. 11 is a diagram showing the data structure of a monitoring database.

FIG. 11 shows an example of the data structure of the monitoring DB 47. In FIG. 11, a pointer that points to a record for each monitoring destination URL that is used as a key is stored in the hash table 81. For example, the pointer that corresponds to the 1st monitoring destination URL "http:// --- " points to the record 82-1; the pointer that corresponds to the 2nd, "ftp:// --- " points to the record 82-2. In the monitoring destination URLs, "http:" and "ftp:" correspond to protocol sections that indicate connection styles.

The records 82-1 and 82-2 have the three entries Target1, Target2 and Target3. These entries are the most recent updated history, the pointer to the list of notification destination URLs and the reference data, respectively.

The most recent updated history includes a time stamp at the time of the most recent updating of the notification destination URL and the file size of the information after updating. The final (nil) in the list of URLs to which the Target2 pointer points is a null datum; it indicates the end of the list. If the form agent 48 has reference data, they are stored as Target3.

The notifying agent 54' can obtain a list of the most recent updating time stamp and file size of the monitoring destination URL, and the notification destination URLs, from this monitoring DB 47, using the monitoring destination URL as a key.

When the monitoring destination URL that the form agent 48 has is not in the hash table 81, the form agent 48 adds it to the hash table 81 as an entry and registers the corresponding record. At this time, the date and time at the time of registration is used as the time stamp, and the file size is registered as 0. In addition, the notification destination URLs that the form agent 48 has are registered as the list of notification destination URLs.

When the monitoring destination URL of the form agent 48 is in the hash table 81 as a key, the entries of the corresponding record are changed. However, the time stamp and the file size are not changed; the notification destination URL of the form agent 48 is added to the list of notification destination URLs.

Then the form agent 48 goes to the delegate place 51 and, for example, adds a record to the delegate DB 52 or changes a record.

Figure 12:
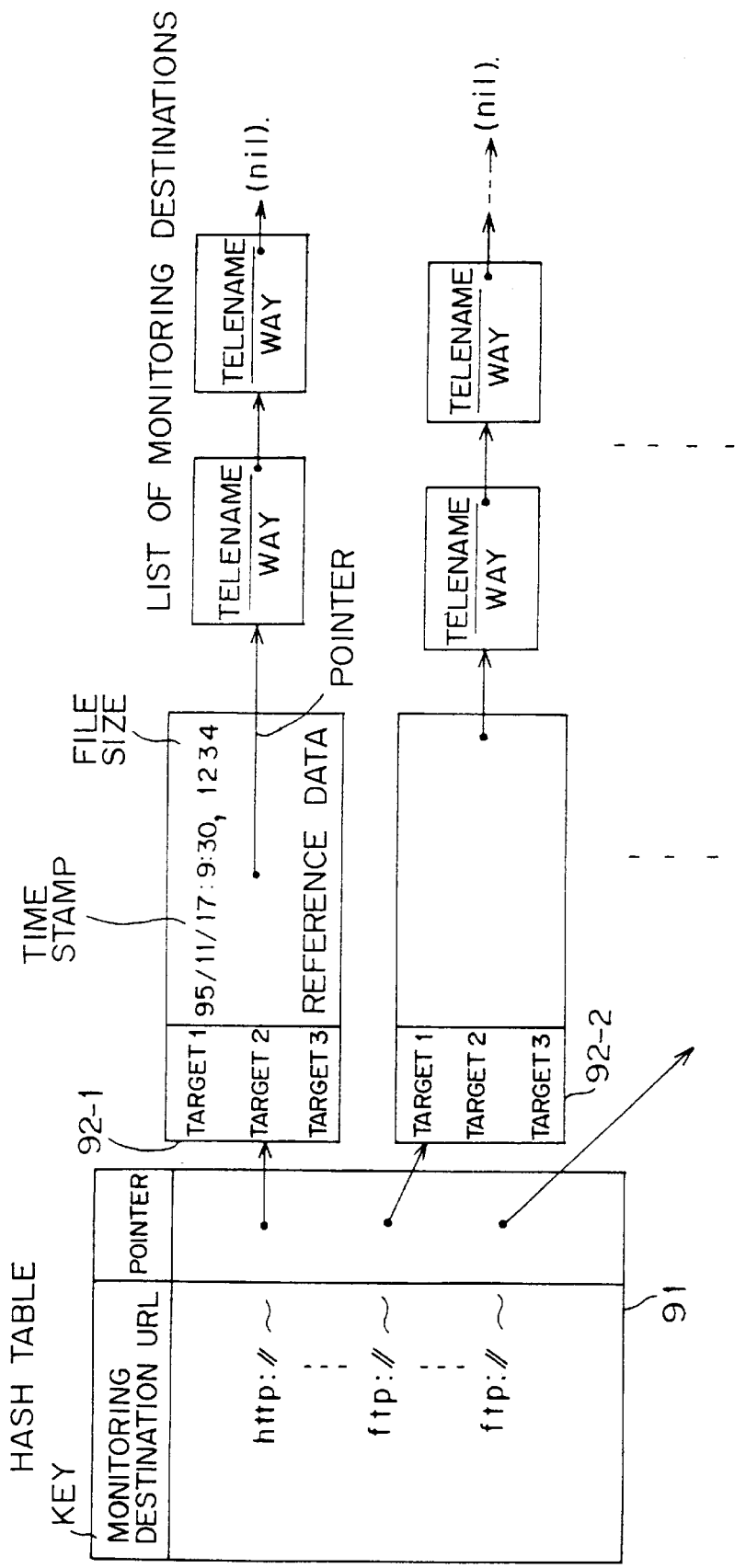
FIG. 12 is a diagram showing the data structure of a delegation database.

FIG. 12 shows an example of the data structure of the delegate DB 52. In FIG. 12, as in the case of the hash table 81, a pointer is stored in the hash table 91 for each monitoring destination URL. For example, the pointer corresponding to the 1st monitoring destination URL "http:// --- " points to the record 92-1; the pointer corresponding to the 2nd, "ftp:// --- ", points to the record 92-2.

The records 92-1 and 92-2 have three entries, Target1, Target2 and Target3; the contents of Target1 and Target2 are the same as in the case shown in FIG. 11.

Target2 is a pointer to the notification destination list; the Telename and Way of the monitoring service place 46 which sent the form agent 48 are used as the notification destination. Here, the Telename is an identifier that uniquely identifies the place; the Way is the method of movement to that place. This information is included in the TicketStub, which is the return value for GO of the form agent 48.

The notifying agent 54 can obtain the time stamp and the file size of the most recent updating of the monitoring destination URL, and the address list of the notification destination monitoring service place 46, from this delegate DB 52, using the monitoring destination URL as a key.

In addition, the form agent 48 can add records to and change records in the delegate DB 52, as in the monitoring DB 47. However, the information on the TicketStub of the form agent 48, rather than the notification destination URL, is used as the notification destination.

The monitoring service place 46 performs the roles of separating the method of monitoring the resource from the method of issuing and notifying monitoring requests putting it into a generalized form in which resources expressed in URL can be monitored. This makes it possible to provide a URL monitoring service which monitors URLs on behalf of a plurality of users having a variety of user interfaces.

The delegate place 51 is set up for the purpose of checking the updated history of the monitoring destination URL and monitoring those changes. The method of notifying the user is concealed by the monitoring service place 46, so it is not necessary for the delegate place 51 to know it.

The monitoring agent 53 is inside the delegate place 51; it periodically checks the time stamp and file size of the monitoring destination URL inside the delegate DB 52 by means of a file transfer protocol (FTP).

Figure 13:
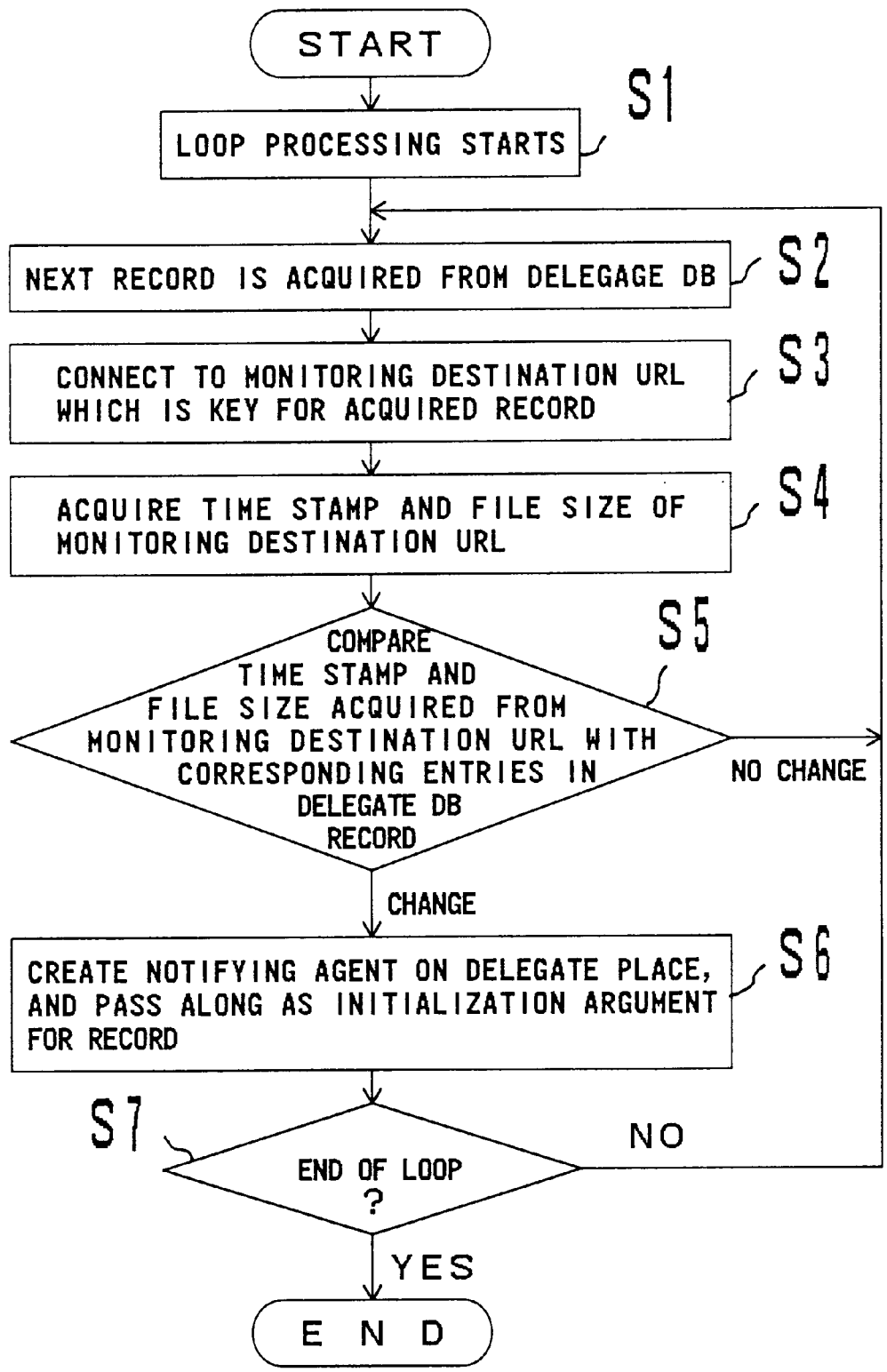
FIG. 13 shows a flow chart of monitoring agent processing.

FIG. 13 is a flow chart of the monitoring processing performed by the monitoring agent 53. In FIG. 13, when processing starts the monitoring agent 53 starts loop processing (step S1), then uses the hash table 91 in the delegate DB 52 to acquire the record corresponding to the next monitoring destination URL (step S2).

Next, the monitoring destination URL, which is the key for the record that was acquired, is connected by the file transfer protocol (FTP) (step S3). Then the time stamp and file size of the monitoring destination URL are acquired (step S4), and those are then compared to the entries corresponding to the delegate DB 52 record (step S5). Here, we investigate whether or not there has been a change in the time stamp and file size of the monitoring destination URL.

If the time stamps and file sizes are different, and it is judged that there has been a change in the monitoring destination URL, a notifying agent 54 is created on the delegate place 51, and the delegate DB 52 record is passed to the notifying agent 54 as an initialization argument.

Next, it is judged whether or not to end the loop processing (step S7). This judgment is performed by checking whether or not predetermined appropriate ending conditions are satisfied. Since the ending conditions are not normally satisfied, the processing starting with step S2 is repeated semi-indefinitely. Even in a case in which it can be judged in step S5 that there has not been a change in the monitoring destination URL, the processing starting with step S2 is repeated. If the ending conditions are satisfied in step S7, then the processing is ended.

In the monitoring processing in FIG. 13, an FTP connection is made to the monitoring destination URL and the updated information (updated history) is acquired. Apart from this, it is also possible to use a method in which the manager of the monitoring destination URL sends an update agent that has the updated information to the delegate place 51. In this case, the update agent meets the monitoring agent 53 inside the delegate place 51, and passes the updated information to it. In this way, the monitoring agent 53 receives the updated information sent from the monitoring destination URL in a more active way.

In the monitoring processing, it is in the nature of the processing that it is necessary to acquire the updated information of the monitoring destination URL by some means or other, so periodic communication with the monitoring destination URL is necessary. For this reason, it is more efficient if only locations that are close to the delegate place 51 in the sense of network distance are made targets of monitoring.

If a location that is far from the delegate place 51 is to be monitored, it is possible that another delegate place can be set up close to the monitoring destination URL to represent the delegate place 51, etc. and perform the monitoring. That is, a delegate of the delegate would be used.

The notifying agent 54 created by the monitoring agent 53 changes those records in the delegate DB 52 and the monitoring DB 47 that concern the updated URL.

Figure 14:
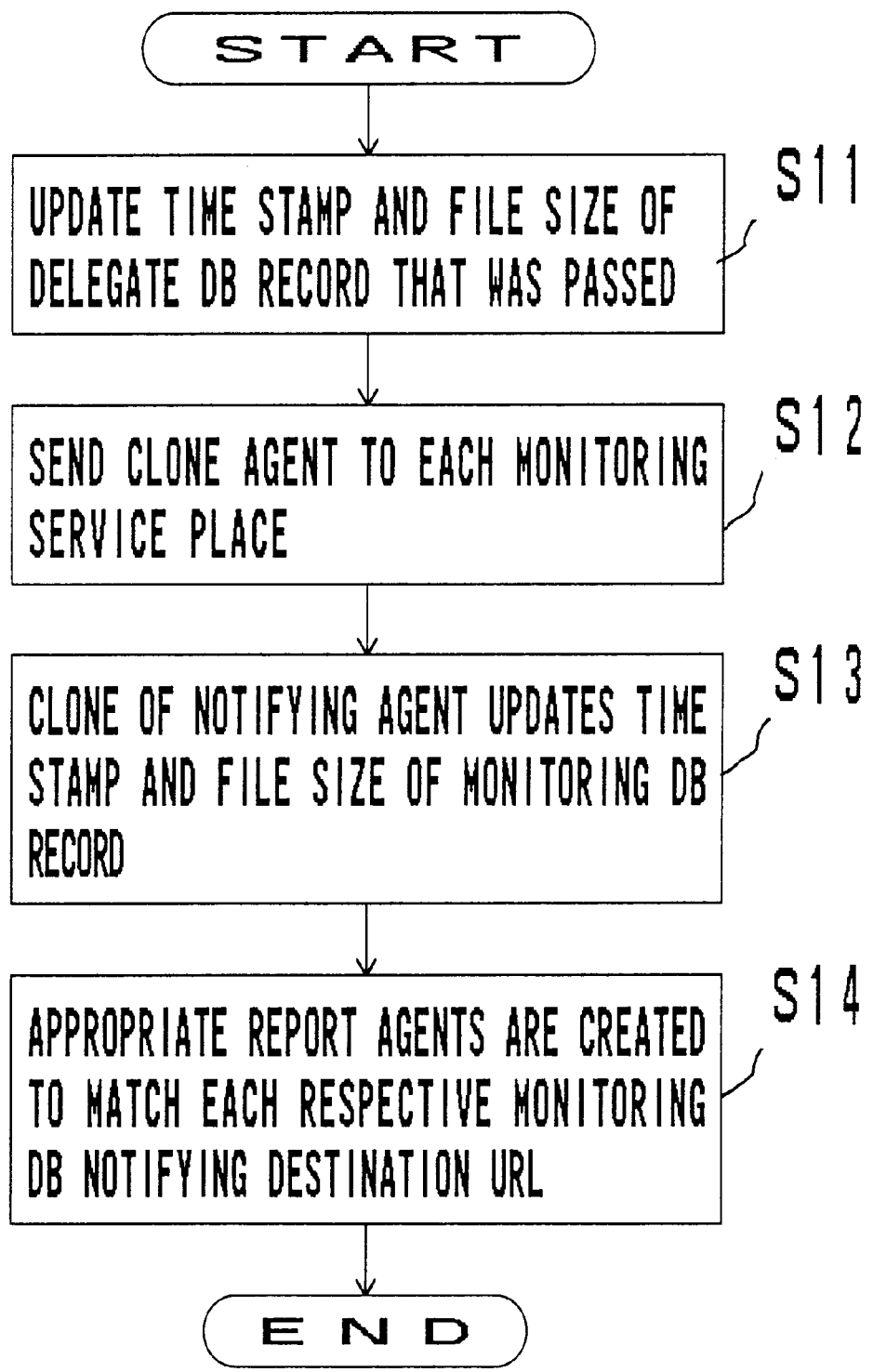
FIG. 14 shows a flow chart of notification agent processing.

FIG. 14 is a flow chart of the processing of the notifying agent 54. In FIG. 14, when processing starts the notifying agent 54 first updates the time stamp and file size of the record in the delegate DB 52 that had been passed to it as initialization arguments, to those of the monitoring URL (step S11).

Next, the SEND command is executed using the Telename and Way stored in the corresponding notification destination list, and a clone notifying agent 54' is sent to each monitoring service place (step S12).

The notifying agent 54' has the most recent update history data, and moves, for example, to the monitoring service place 46. Then the time stamp and file size of the corresponding record inside the monitoring DB 47 are updated to the most recent ones (step S13).

Next, referring to the notification destination URL list of that record, report agents appropriate for each notifying destination URL are created (step S14), and the processing is ended. The report agent class is different for each notifying method, that is to say, protocol section contained in the URL; some examples of classes are given below. Here, the class corresponds to the definition of the object structure.

(a) If the protocol section is "mailto:", the class defines notification by E-mail.

(b) If the protocol section is "http:", the class defines notification after the HTML document link list page is updated.

(c) If the protocol section is "ftp:", the class defines file system maintenance.

Consequently, by referring to the notification destination URL protocol section, the notifying agent 54' can determine the class of the report agent to be created and create that instance. Here, "instance" means a specific example of an object defined by the class; in the present case it refers to the report agents 55, 56, 57 and 58, etc.

Next, let us explain the processing of the report agent of each class. A "mailto" report agent corresponds to the report agents 55 and 56. The report agent 56 sends the updated URL to the notification destination URL by the E-mail 59.

In the case of the report agent 55, which is a further developed form of the report agent 56, magic mail is sent to the Magic Cap 41. A method of describing magic mail in URL is given in the RFC (Request For Comments). There is also a method which uses a gateway for the purpose of passing magic mail.

The http report agent corresponds to the report agent 57, and adds the updated URL to the link list inside the HTML document 60 in the notification destination URL.

This HTML document 60 has a format similar to, for example, that of the HTML document 76 in FIG. 9, and has a list of updated URLs as a link list. The HTML document 60 link list is empty at the time of the monitoring request, but updated URLs are added one at a time by the report agent 57.

The user can jump to the corresponding page by clicking one of the links in the link list displayed on the terminal. This permits the user to actually confirm the updated information.

The ftp report agent corresponds to the report agent 58. It performs maintenance of the file system of the FTP site 61 in the notification destination URL. The report agent 58 judges, for example, which version of application software is involved from the updated URL file name, and deletes the corresponding old version from inside the FTP site 61. Then it acquires the new version from the updated URL and adds it to the file system inside the FTP site 61.

Thus, the report agent can not only notify the updated URL, but can also physically change the file system. In addition, if the user specifies 2 or more notification destination URLs at the time of the monitoring request input, a report agent is created for each of those URLs and the updated URL reports are sent simultaneously, for example, by mail. A variety of devices, including, for example, the user's telephone pager, can also be used as the notification destination.

Next, let us explain the input processing and the notification processing in the case in which the WEB browser 43 is used as the monitoring request input interface 10 and the notifying interface 11, referring to FIGS. 15 through 20.

In the following discussion, the URL in which the HTML document 76 for the purpose of displaying the list of monitoring destination URLs specified by the user is located will be called the specified list display URL. In addition, the URL in which the HTML document 60 for the purpose of displaying the list of updated monitoring destination URLs is located will be called the updated list display URL. As will be explained below, this updated list display URL is the same as the notification destination URL of the monitoring DB 47.

Figure 15:
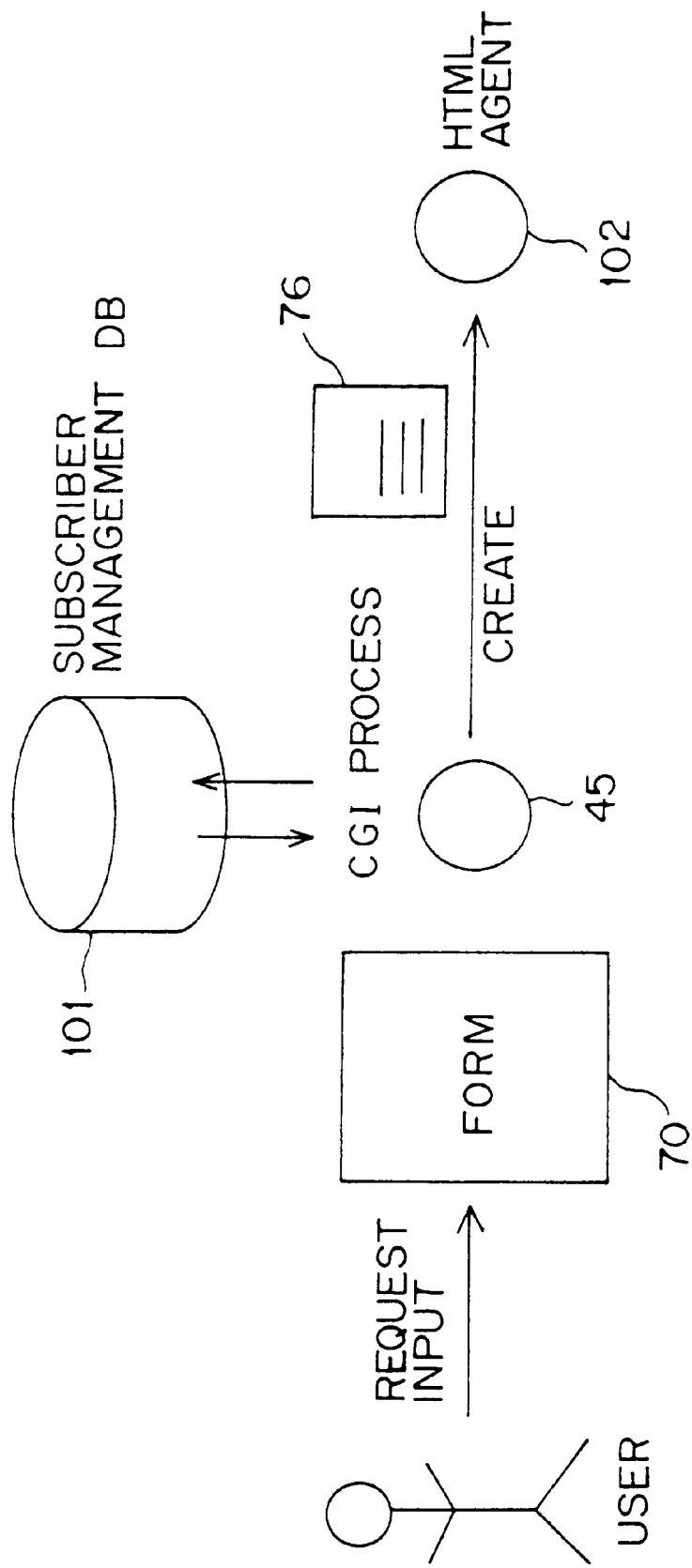
FIG. 15 is a diagram showing the processing at the time of a new request.
Figure 16:
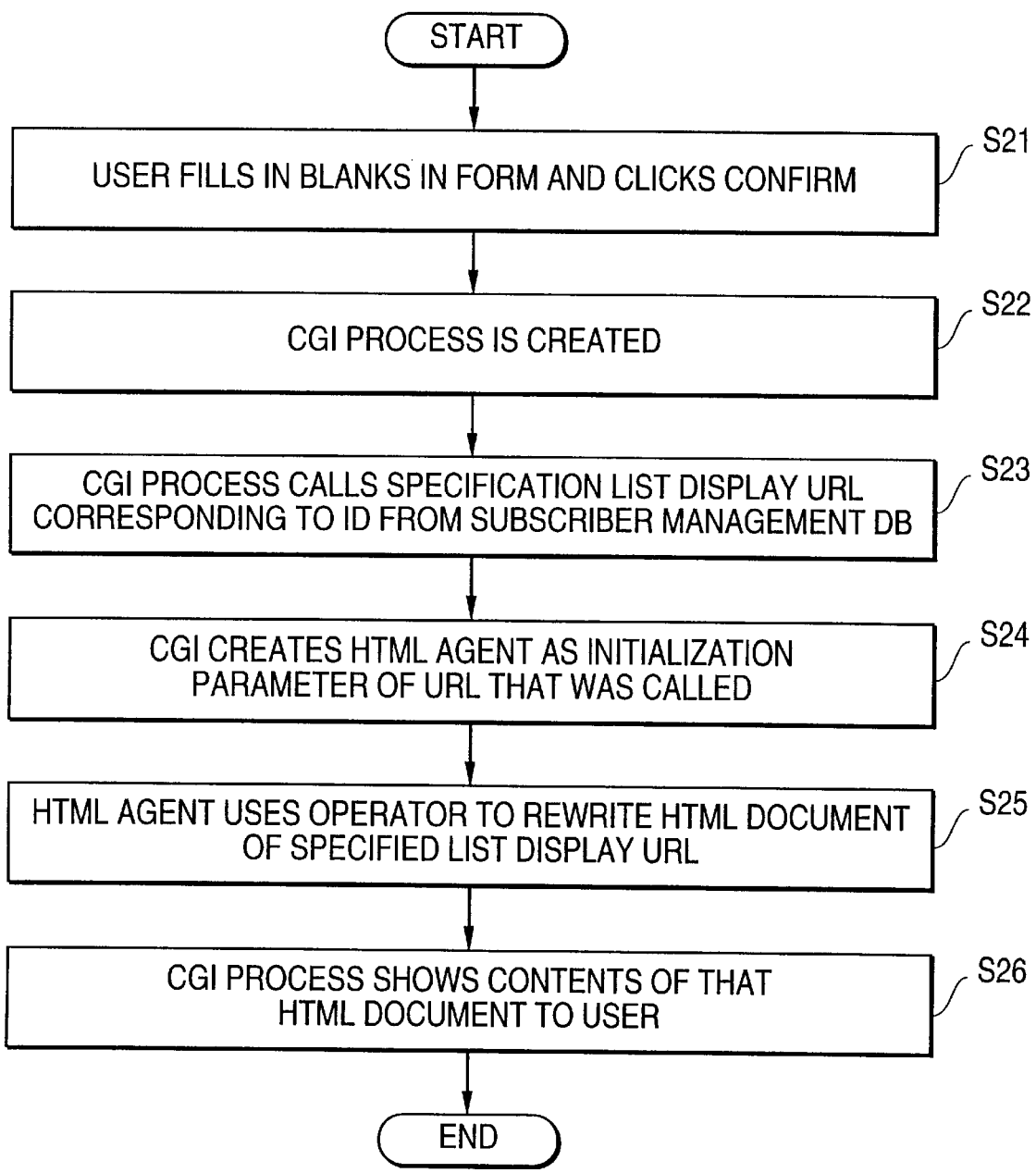
FIG. 16 shows a flow chart of processing at the time of a new request.

FIG. 15 shows an outline of the processing at the time of a new monitoring request, and FIG. 16 is a flow chart of that processing. In FIG. 15, the subscriber management database (DB) 101 is set up in a location where it can be referred to from the user terminal, and stores a specified list display URL for each subscriber ID. At the time when a new monitoring request is input, the CGI process 45 and the HTML agent 102 are created.

When the processing shown in FIG. 16 starts, the user first fills in the blanks in the monitoring request form 70 shown in FIG. 9, and then clicks the Confirm button 75 (step S21). This creates the CGI process 45 (step S22).

The CGI process 45 obtains the specified list display URL corresponding to the ID that was input from the subscriber management DB 101 (step S23), then, with that as an initialization parameter, creates the HTML agent 102 (step S24).

The HTML agent 102 holds, for example, skeleton data, which is a prototype of the HTML document 76 in FIG. 9. In addition, it has an operator that interprets the existing HTML document and extracts the links, and an operator that embeds the given list of links into the skeleton data and creates a new HTML document.

The HTML agent 102 uses these operators to rewrite the specified list display URL HTML document 76 (step S25). In this way, 1 or more newly input monitoring destination URLs are written into the HTML document 76 as a link list.

The CGI process 45 shows the contents of the HTML document 76 to the user (step S26), and then ends processing. At the same time, input information such as the monitoring destination URL and the notification destination URL, etc. is sent to the monitoring service place 46.

Figure 17:
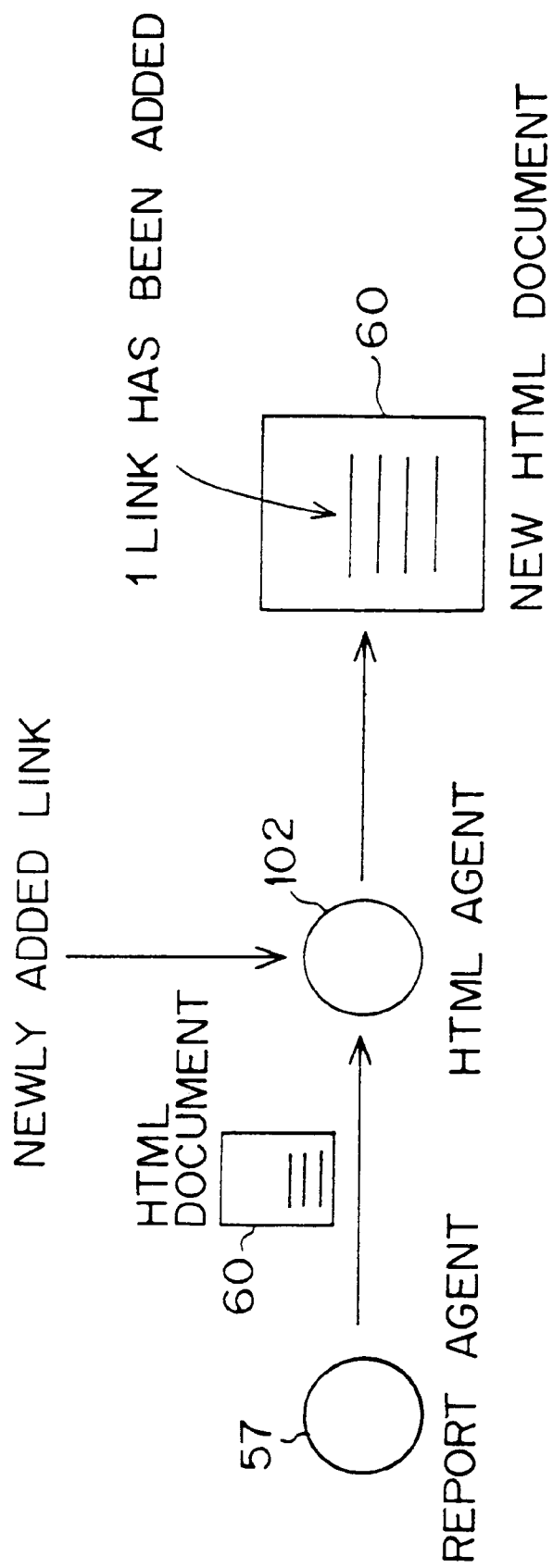
FIG. 17 is a diagram showing the processing at the time of an update of a monitored resource.
Figure 18:
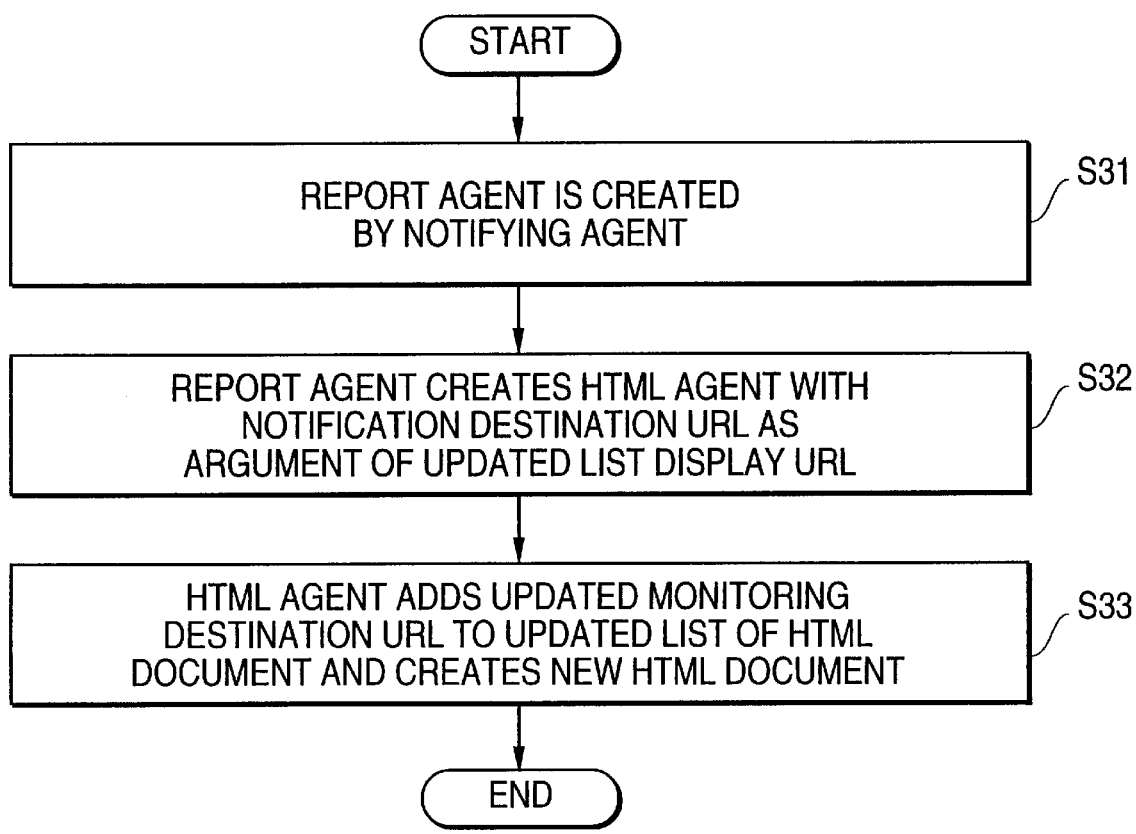
FIG. 18 shows a flow chart of the processing at the time of an update of a monitored resource.

FIG. 17 shows an outline of the processing at the time a monitored resource is updated; FIG. 18 is a flow chart of that processing. At the time the monitored resource is updated, the notifying agent 54' is sent from the delegate place 51 to the monitoring service place 46, thus sending the updated information.

When the processing shown in FIG. 18 starts, the notifying agent 54' creates the report agent 57 (step S31). The report agent 57 regards the notification destination URL as the updated list display URL, and uses this as an argument to create the HTML agent 102 (step S32).

The HTML agent 102 adds the monitoring destination URL in which updating occurred to the link list inside the HTML document in which the updated list display URL is located, and creates the new HTML document 60 (step S33). Then the processing ends.

Then the contents of the HTML document 60 are shown to the user, and the URL that was updated is reported.

Figure 19:
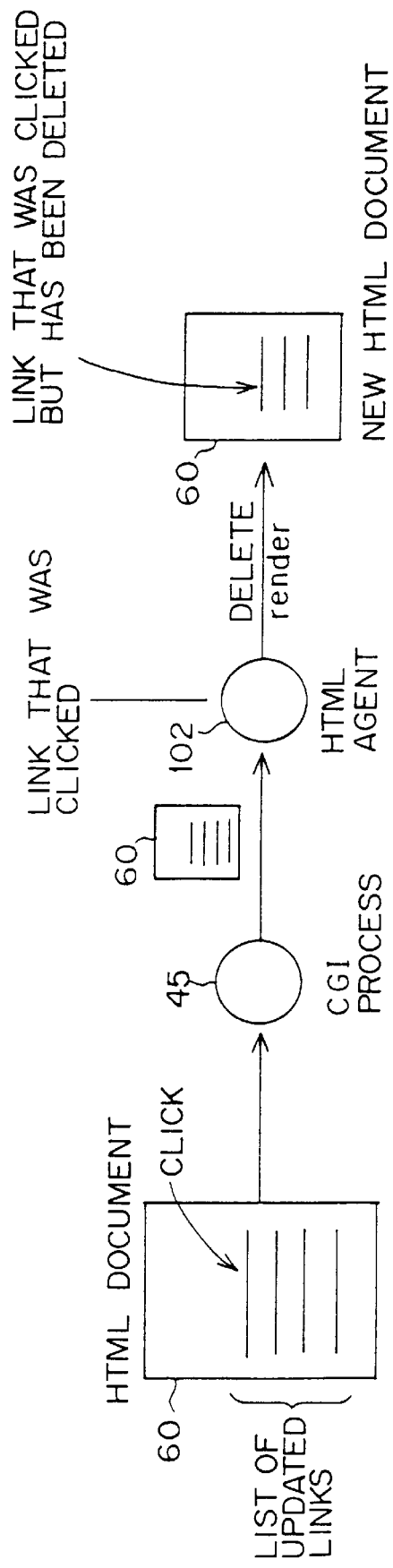
FIG. 19 is a diagram showing the processing at the time of a link reference.
Figure 20:
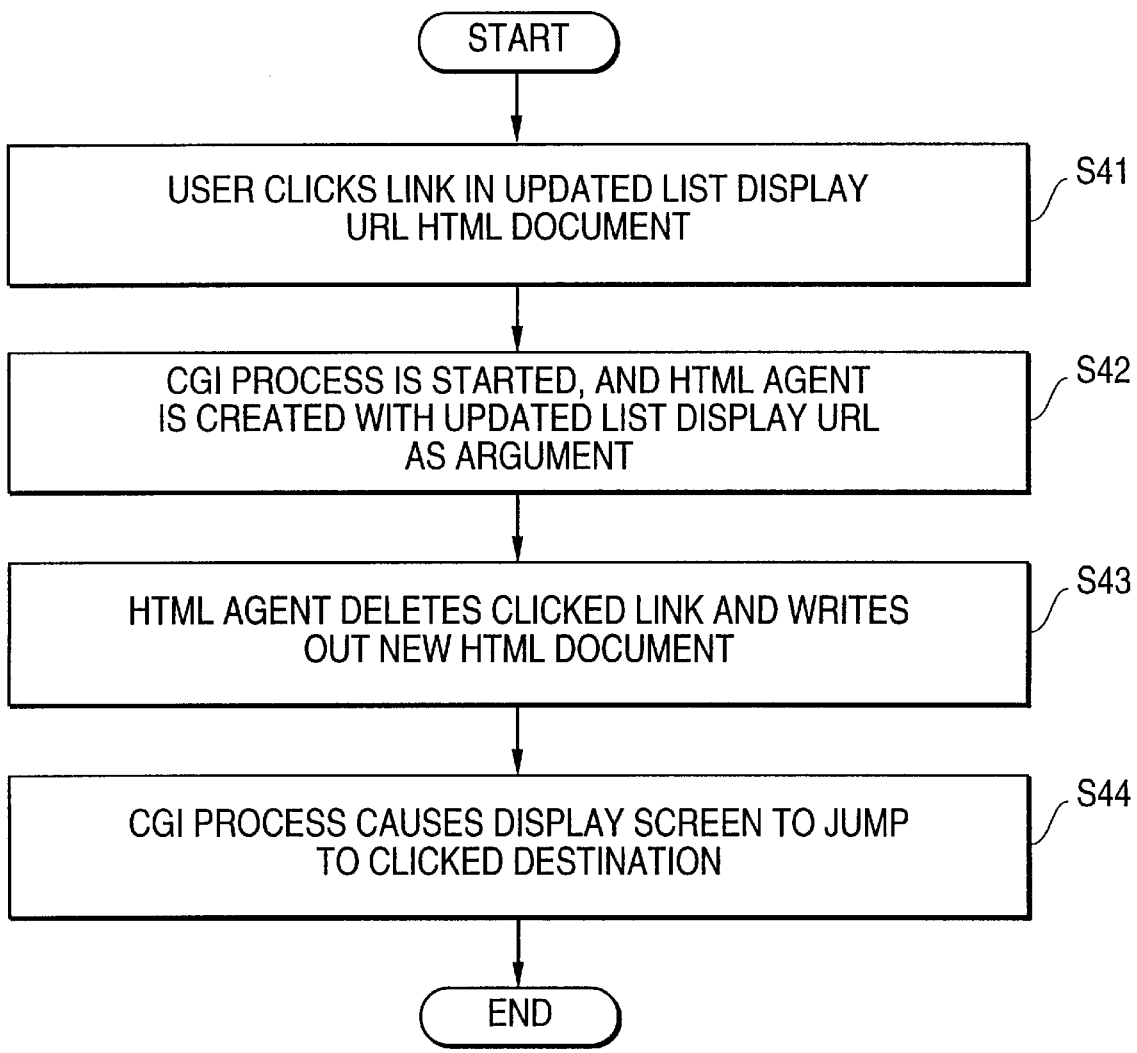
FIG. 20 shows a flow chart of the processing at the time of a link reference.

FIG. 19 shows an outline of the processing when the user refers to the link of the HTML document 60;

FIG. 20 is a flow chart of that processing. At the time the link is referred to, the CGI process 45 is started up, and the HTML document 60 is updated.

When the processing shown in FIG. 20 starts, first the user looks at the link list of the HTML document 60 of the updated list display URL, then clicks one of the links (step S41). This starts the CGI process 45. The CGI process 45 creates the HTML agent 102, using the updated list display URL as an argument (step S42).

The HTML agent 102 deletes the link that was clicked from the link list and writes out the new HTML document 60 (step S43). The CGI process 45 causes the display screen to jump to the URL of the link that was clicked (step S44), and the processing ends.

In this way, it is possible for the user to refer to a page that has been linked, and the reference operation is reflected in the HTML document 60.

In an embodiment that uses remote programming such as is described above, by using the autonomy of each agent it is possible to independently process monitoring requests from a plurality of users. In addition, by setting up a delegate place 51 separate from the monitoring service place 46, the processing that depends on the interface and the generalized monitoring processing according to the URL are separated from one another. For this reason, it becomes possible to monitor the resource from a close distance, forming a highly efficient delegation system.

If the notifying unit management system 12 is located near the monitored resource in the sense of network distance, there is no objection to locating the delegate place 51 inside the notifying unit management system 12. In such a case, the notifying unit management system 12 also performs the role of the URL monitoring system 13. In addition, the monitoring destination resource does not need to be described by a URL; other arbitrary identification information can also be used.

In addition, arbitrary devices and programs, not only those shown in FIG. 8, can be used as the monitoring request input interface 10 and the notifying interface 11.

Further, when this invention is implemented, it is not necessary to use agents and places; it is sufficient for the respective processing to be done by ordinary processes. In this case, the exchange of information via the network can be done with, for example, RPCs (Remote Procedure calls).

According to this invention, it becomes possible for changes in an information resource on a communication network to be monitored for instead of by a user; it can be expected that this will make it unnecessary for the user to access the resource many times in order to check the information. Accordingly, the communication load on the network is greatly reduced, making it possible for the user to use the network for many other purposes.

What is claimed is:

1. A network resource monitoring system for use in an information processing system on a communication network through which information sent from a plurality of sending sources flows, comprising:

monitoring means for monitoring a state of a user-accessible resource on the communication network based on a request from a user which specifies the resource; and output means for outputting change information that indicates that the state of the resource has changed.

2. A network resource monitoring system according to claim 1, further comprising receiving means for receiving said change information and notifying said change information to the user.

3. A network resource monitoring system according to claim 2, wherein said monitoring means and output means are located at a first location from where the resource can be accessed at relatively low cost using the communication network, and said notifying means is located at a second location from where said change information can be provided to the users' information terminal.

4. A network resource monitoring system according to claim 2, wherein said output means has a data base means in which address information of said notifying means is stored as an output destination of said change information.

5. A network resource monitoring system according to claim 2, wherein said notifying means uses an agent process corresponding to a method of notifying to a notification destination to notify said change information to the user.

6. A network resource monitoring system according to claim 1, wherein said monitoring means monitors the state of the resource on behalf of a plurality of users, based on requests from the plurality of users.

7. A network resource monitoring system according to claim 6, wherein said monitoring means uses an agent process to monitor the state of the resource.

8. A network resource monitoring system according to claim 1, wherein said monitoring means receives identification information which corresponds to a resource to be monitored and describes at least one resource on the communication network in a unified manner, and monitors the resource to be monitored specified by said identification information.

9. A network resource monitoring system according to claim 8, wherein said monitoring means receives a monitoring destination Uniform Resource Locator as said identification information and monitors the resource having said monitoring destination Uniform Resource Locator, thereby separates a monitoring function from a function of notifying to the user.

10. A network resource monitoring system for use in an information processing system on a communication network through which information sent from a plurality of sending sources flows, comprising:

management means for receiving a monitoring request from a user which requests monitoring of a state of a user-accessible resource on the communication network and specifies the resource, and for managing a notification destination when there is a change in the state of the resource; and notifying means for notifying change information that indicates a change in the state of the resource to said notification destination.

11. A network resource monitoring system according to claim 10, wherein said notifying means displays identification information of the resource included in said change information on a user terminal at said notification destination so that the user can refer to the state of the resource after the change.

12. A network resource monitoring system according to claim 10, wherein said notifying means uses an agent process corresponding to a method of notifying to said notification destination to notify the change information.

13. An information processing terminal for use in an information processing system on a communication network through which information sent from a plurality of sending sources flows, comprising:

input interface means for inputting a monitoring request from a user that requests monitoring of a state of a user-accessible resource on the communication network and specifies the resource; and notification interface means for receiving change information that indicates a change in the state of the resource.

14. An information processing terminal according to claim 13, wherein said notification interface means displays identification information of the resource included in said change information so that a user can refer to the state of the resource after the change.

15. A computer-readable storage medium, when used by a computer, used to direct said computer to perform the functions of:

monitoring a state of a user-accessible resource on a communication network, based on a request from a user which specifies the resource; and outputting change information that indicates a change in the state of the resource.

16. A computer-readable storage medium, when used by a computer, used to direct said computer to perform the functions of:

receiving a monitoring request from a user that requests monitoring of a state of a user-accessible resource on a communication network and specifies the resource;

managing a notification destination when there is a change in the state of the resource; and notifying change information that indicates a change in the state of the resource to said notification destination.

17. A computer-readable storage medium, when used by a computer, used to direct said computer to perform the functions of:

inputting a monitoring request from a user that requests monitoring of a state of a user-accessible resource on a communication network and specifies the resource; and receiving change information that indicates a change in the state of the resource.

18. A network resource monitoring method, comprising the steps of:

monitoring a state of a user-accessible resource on a communication network, based on a request from a user which specifies the resource; and outputting change information that indicates a change in the state of the resource, when the change has occurred.

19. A network resource monitoring method, comprising the steps of:

receiving a monitoring request from a user that requests monitoring of a state of a user-accessible resource on a communication network and specifies the resource;

managing a notification destination to be used when there is a change in the state of the resource; and notifying change information that indicates the change to said notification destination when the change has occurred.

20. A resource reference method, comprising the steps of:

sending a monitoring request from a user that requests monitoring of a state of a user-accessible resource on a communication network and specifies the resource;

receiving change information that indicates a change in the state of the resource; and referring to the state of the resource after the change based on said change information.

* * * * *